(12) United States Patent
Arthur et al.

(10) Patent No.: US 11,045,836 B2
(45) Date of Patent: Jun. 29, 2021

(54) INTEGRATED AUTOMATION OF PAINT PROCESSES INCORPORATING ARRAYED PAINTING AND INKJET PRINTING

(71) Applicant: The Boeing Company, Chicago, IL (US)

(72) Inventors: Shane E. Arthur, Kirkland, WA (US); Bennett M. Moriarty, Bothell, WA (US); Luis A. Perla, Sammamish, WA (US); Jeffrey S. Rebmann, Kirkland, WA (US); Trevor S. McCrea, Everett, WA (US); Jason S. Warner, Granite Falls, WA (US); Seana B. Kobak, Sammamish, WA (US); Ryan M. Trumbo, Renton, WA (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 16/390,928

(22) Filed: Apr. 22, 2019

(65) Prior Publication Data

US 2019/0247884 A1    Aug. 15, 2019

Related U.S. Application Data

(62) Division of application No. 15/347,375, filed on Nov. 9, 2016, now Pat. No. 10,307,788.

(51) Int. Cl.
*B05D 7/22* (2006.01)
*B05B 13/02* (2006.01)
(Continued)

(52) U.S. Cl.
CPC ............ *B05D 7/22* (2013.01); *B05B 13/0207* (2013.01); *B05B 13/0436* (2013.01);
(Continued)

(58) Field of Classification Search
None
See application file for complete search history.

(56) References Cited

U.S. PATENT DOCUMENTS 2,829,528 A * 4/1958 Hulick, Jr. ................ B01L 7/00
74/86
4,401,699 A    8/1983 Baskett
(Continued)

FOREIGN PATENT DOCUMENTS

| CN | 102555481 | 7/2012 |
| EP | 1065055 A1 | 1/2001 |
| GB | 2190312 A | 11/1987 |

OTHER PUBLICATIONS

Search Report for related European Application No. EP17185871.5; report dated Mar. 6, 2018.
(Continued)

*Primary Examiner* — Jethro M. Pence (57) ABSTRACT

Surface treatment of a tubular surface defining an axis extending from a first surface end to a second surface end includes partially surrounding the tubular surface, at a first position, with a first set of treating units, with the treating units arranged in a first arcuate array. Furthermore, each treating unit is configured to include a plurality of first applicator heads. In some examples, a position of each of the plurality of first applicator heads is determined relative to the tubular surface. The first set of treating units is moved from the first position towards a second position. In one non-limiting example, each of the plurality of first applicator heads is independently controlled to selectively apply a first treatment as the first set of treating units moves from the first position towards the second position.

20 Claims, 8 Drawing Sheets

(51) Int. Cl.
*B05B 13/04* (2006.01)
*B41J 2/01* (2006.01)
*B64F 5/10* (2017.01)
*B05C 5/02* (2006.01)

(52) U.S. Cl.
CPC ............ *B05C 5/027* (2013.01); *B05C 5/0208* (2013.01); *B41J 2/01* (2013.01); *B64F 5/10* (2017.01); *B05B 13/041* (2013.01)

(56) References Cited

U.S. PATENT DOCUMENTS

| | | |
|---|---|---|
| 8,545,943 B2 | 10/2013 | Frankenberger et al. |
| 2002/0117193 A1 | 8/2002 | Anderson |
| 2006/0068109 A1 | 3/2006 | Frankenberger et al. |
| 2012/0012723 A1 | 1/2012 | Mansfield |
| 2018/0056670 A1* | 3/2018 | Kerr ................... B25J 11/0075 |
| 2018/0071773 A1* | 3/2018 | Eng ....................... B05B 12/04 |

OTHER PUBLICATIONS

EPO, Examination Report for Application No. EP17185871.5, dated Apr. 28, 2020.
Chinese Patent Office, Chinese Office Action for Application No. 2017110908149, dated Sep. 29, 2020.
Canadian Patent Office, Canadian Office Action for Application No. 2,977,155, dated Jan. 7, 2021.
EPO, Examination Report for Application No. EP17185871.5, dated Nov. 13, 2020.
Brazilian Patent Office, Office Action for Application No. BR102017023641-2, dated Apr. 20, 2021.

* cited by examiner

INTEGRATED AUTOMATION OF PAINT PROCESSES INCORPORATING ARRAYED PAINTING AND INKJET PRINTING

FIELD

The present disclosure relates generally to automated surface treatment systems and methods, and more specifically to the use of an ink jet array for automating a paint process.

BACKGROUND

Treating and coating structural surfaces of machines, such as commercial aircraft, is a long and extensive process. Surface preparation requires a large number of technicians to perform a series of manual operations to clean and prepare the surface before the actual surface coating can begin. Furthermore, coating the structural surfaces includes applying several underlying protective basecoats followed by applying a decorative livery coating over the top. The decorative livery coatings are applied using a complex process which requires a series of masking operations followed by applying colored paints or coatings where they are needed. These masking and painting operations are serially repeated until the exterior surface treatment is completed. Performing these processes on large surface areas, therefore, requires a significant amount of time and resources.

SUMMARY

In accordance with one aspect of the present disclosure, a surface treatment assembly is provided for treating a tubular surface defining an axis between a front end of the tubular surface and a rear end of the tubular surface. The surface treatment assembly includes a first set of treating units having a plurality of contiguous, axially aligned treating units arranged in a first arcuate array to partially surround the tubular surface at a first position along the axis, each treating unit of the first set of treating units including a plurality of first applicator heads. A control module is configured to independently control each of the plurality of first applicator heads to selectively apply a first treatment to the tubular surface and move the first set of treating units from the first position along the axis towards a second position along the axis, wherein each treating unit of the first set of treating units traverses an axial path over the tubular surface from the first position along the axis to the second position along the axis.

In accordance with another aspect of the present disclosure, a surface treatment assembly is provided for treating a tubular surface defining an axis between a front end of the tubular surface and a rear end of the tubular surface. The surface treatment assembly includes a first set of treating units supported for movement along the axis from a first position along the axis to a second position along the axis, the first set of treating units including a plurality of contiguous, axially aligned treating units arranged in a first arcuate array to partially surround the tubular surface. Each treating unit of the first set of treating units includes a plurality of first applicator heads configured to apply a first treatment to the tubular surface. Furthermore, each treating unit of the first set of treating units traverses an axial path over the tubular surface from the first position along the axis to the second position along the axis.

In accordance with yet another aspect of the present disclosure, a surface treatment assembly is provided for treating a surface of an airplane fuselage defining an axis between a front end of the surface and a rear end of the surface. The surface treatment assembly includes a first treating module having a first frame assembly configured to traverse along the axis from a first position along the axis to a second position along the axis, and a first set of treating units coupled to the first frame assembly, the first set of treating units including a plurality of contiguous, axially aligned treating units arranged in a first arcuate array to partially surround the airplane fuselage, each treating unit of the first set of treating units including a plurality of first applicator heads. A control module is operably coupled to the first frame assembly and each of the plurality of first applicator heads, and programmed to move the first frame assembly along the axis from the first position to the second position and, while the first frame assembly is moving, to independently control each of the plurality of first applicator heads to selectively apply a first treatment to the airplane fuselage, wherein each treating unit of the first set of treating units traverses an axial path over the airplane fuselage.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both methods and devices for carrying out the disclosure. Actual scope of the disclosure is as defined by the appended claims.

Figure 1:
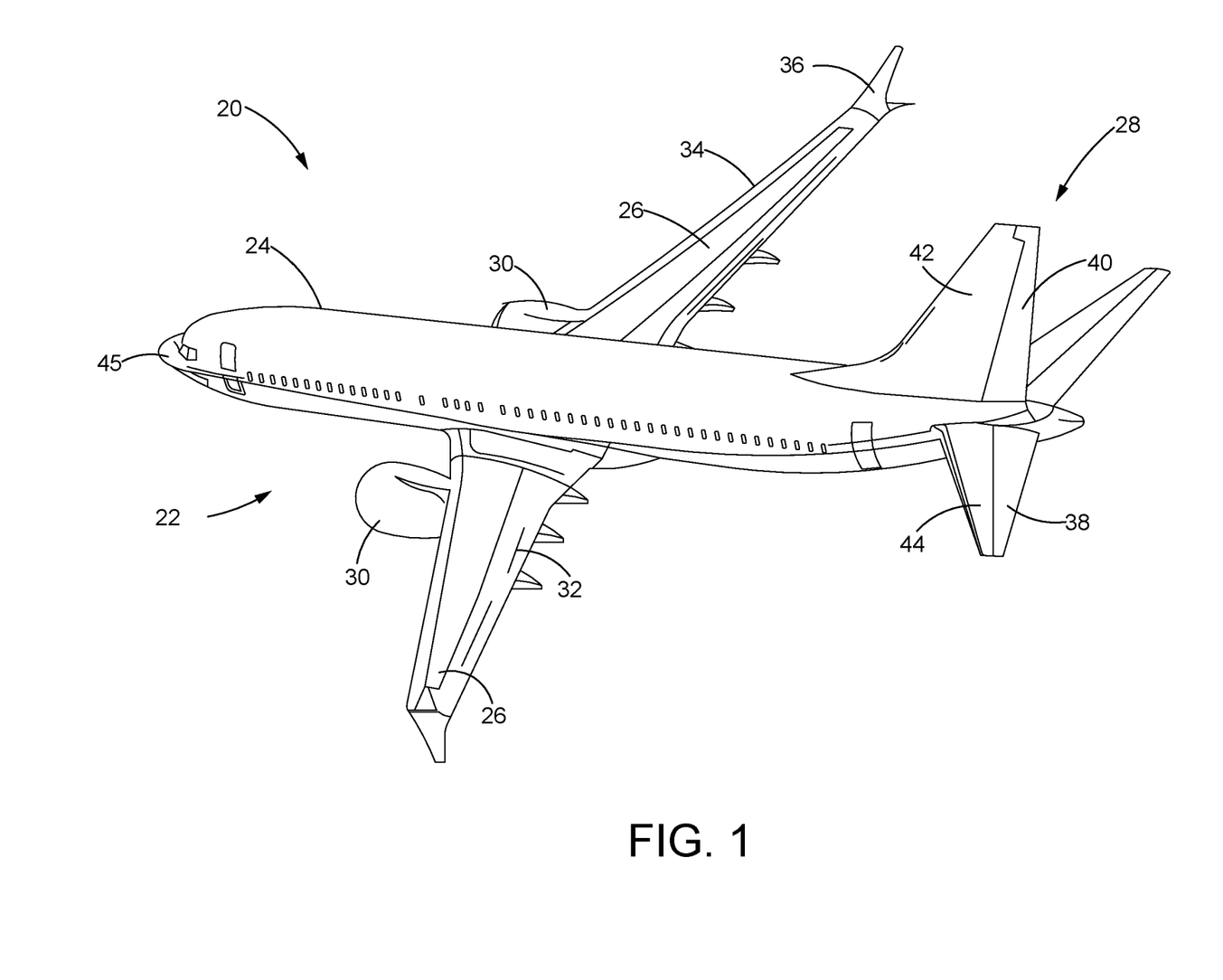
FIG. 1 is a perspective view of an exemplary vehicle constructed in accordance with the present disclosure.

In FIG. 1, a vehicle 20 is illustrated. One non-limiting example of the vehicle 20 is that of an aircraft, however the present disclosure applies to other types of vehicles and machines as well. As illustrated, the vehicle 20 or aircraft, is configured with an airframe 22 which includes a fuselage 24, wings 26, and a tail section 28. In some embodiments, one or more propulsion units 30 are coupled to each wing 26 in order to propel the vehicle 20 in a direction of travel. Furthermore, the wings 26 are fixedly attached to the fuselage 24 and the propulsion units 30 are attached to an underside surface of the wing 26, however other attachment locations of the propulsion units 30 are possible. Furthermore, in some embodiments, the wings 26 are positioned at a substantially centered position along the fuselage 24, and the wings 26 are configured to include a plurality of flaps 32, leading edge devices 34, and peripheral edge devices 36. Moreover, during operation of the vehicle 20, the flaps 32, leading edge devices 34 and peripheral edge devices 36 are capable of being adjusted in a plurality of ways in order to control and stabilize the vehicle 20. For example, the flaps 32 and leading edge devices 34 are adjustable to produce the desired lift characteristics of the wings 26. The tail section 28 of the airframe 22 is comprised of components such as, an elevator 38 a rudder 40 a vertical stabilizer fin 42 and a horizontal stabilizer 44 which provide additional stability and maneuverability functions of the vehicle 20. A nose portion 45 of the fuselage 24 is located opposite from the tail section 28 and in some embodiments the nose portion 45 is designated as the front of the fuselage 24 and the tail section 28 is designated as the rear of the fuselage 24.

Figure 2:
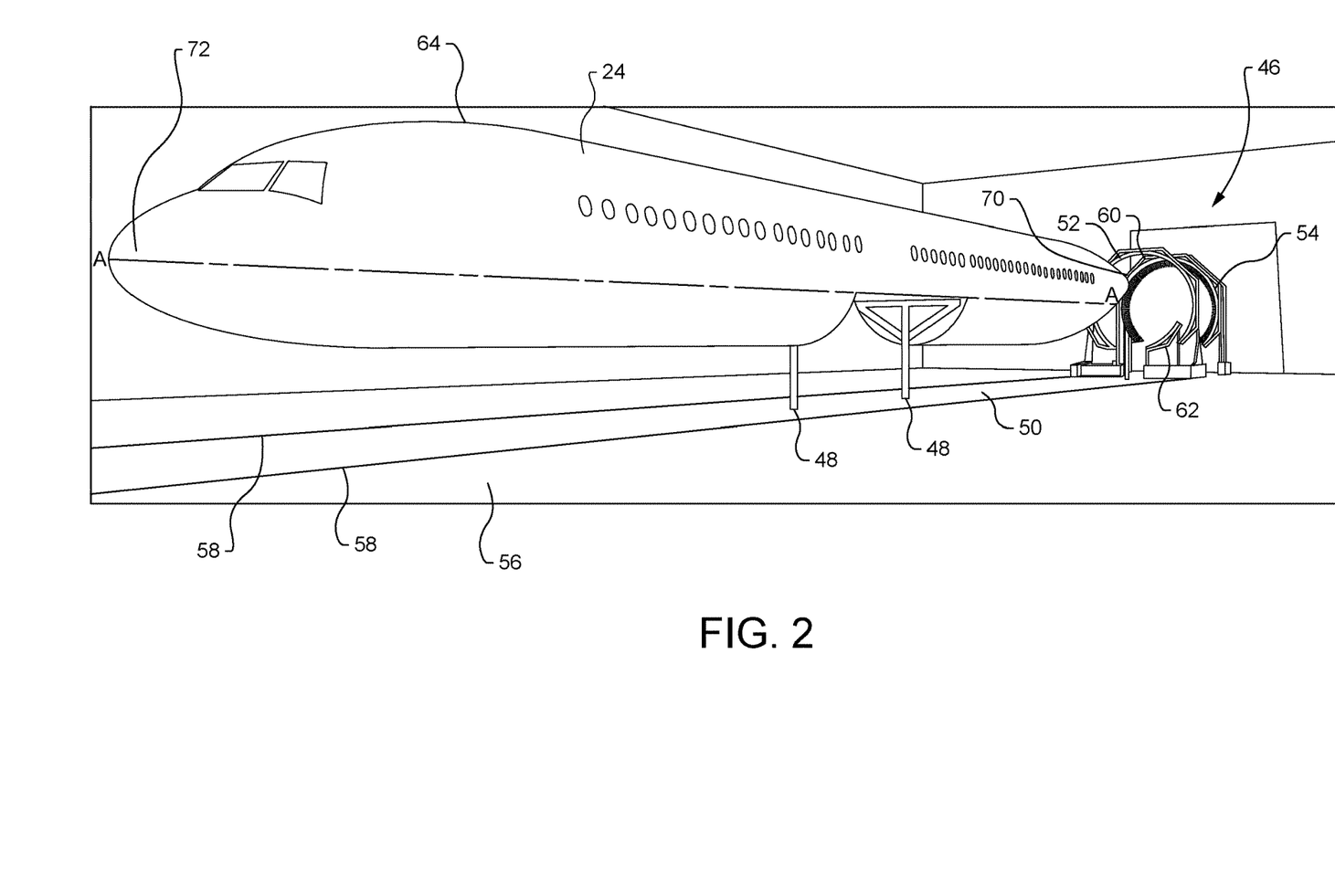
FIG. 2 is a perspective view of an exemplary tubular surface, a first treating module, and a second treating module in accordance with the present disclosure.

Moving on to FIG. 2, one non-limiting example of the tubular structure or fuselage 24 of the vehicle 20 is illustrated. During the manufacture and/or servicing of the vehicle 20 the fuselage 24 is positioned within a work area 46 and prepared for the next manufacturing or scheduled service step. In some embodiments, the manufacturing and/or servicing of the vehicle 20 includes surface treatments of the tubular structure or fuselage 24, such as cleaning, abrading, priming, painting, protecting and other known surface treatments. As further illustrated in FIG. 2, the fuselage 24 is prepared for surface treatments by positioning the fuselage 24 within the work area 46 prior to attaching, or otherwise coupling, the wings 26, the tail section 28 and other vehicle components to the fuselage 24. However, in alternative embodiments, the surface treatment is possible with the wings 26, the tail section 28 and other vehicle 20 components already being attached to the fuselage 24. Prior to the start of the surface treatment the fuselage 24 is mounted on one or more stationary support frames 48 which properly position and support the fuselage 24 within the work area 46. In one non-limiting embodiment, the stationary support frames 48 are attached to the underside of the fuselage 24 and anchored to a movable platform 50 and the moveable platform 50 is configured to transport the fuselage 24, and other vehicle components into and out of the work area 46. Furthermore, the moveable platform 50 will allow the fuselage 24 to be transported along other portions of the vehicle assembly line or service area. While FIG. 2 illustrates the use of the stationary support frames 48 and moveable platform 50, it will be known to those skilled in the art that other methods of positioning, supporting and transporting the fuselage 24 and other vehicle 20 components are possible.

As further illustrated in FIG. 2, the work area 46 is equipped with a first treating module 52 and a second treating module 54 which are movably coupled to the floor 56 of the work area 46. In some embodiments, the first and second treating modules 52, 54 are attached to the moveable platform 50 and configured to move along the floor 56 of the work area 46. Alternatively, the first and second treating modules 52, 54 are coupled to a plurality of rails 58 or other known movement mechanism, and the rails 58 are positioned laterally along the moveable platform 50 and the fuselage 24. In some embodiments, the rails 58 are configured to run along a length of the floor 56 which is at least as long as the fuselage 24 and the rails 58 are spaced apart such that the fuselage 24 is capable of being positioned and substantially centered between the rails 58. Furthermore, in one non-limiting example, the first and second treating modules 52, 54 are attached to the rails 58 and are propelled along the rails 58 during treatment of the fuselage 24. While FIG. 2 illustrates the presence of a single first treating module 52 and a single second treating module 54, it will be noted that other embodiments will use a plurality of first treating modules 52 and a plurality of second treating modules 54. Alternatively, in another embodiment a single first treating module 52 or a single second treating module 54 is used for treatment of the fuselage 24.

In one non-limiting example, the first and second treating modules 52, 54 are arcuate or annular in shape and configured to at least partially surround the circumference of the fuselage 24 or other component to be treated. Additionally, the arcuate or annular shape allows the first and second treating modules 52, 54 to be unimpeded by the stationary support frames 48 as the first and second treating modules 52, 54 travel along the fuselage 24. For example, as illustrated in FIG. 2, the first treating module 52 has a first frame 60 and a second frame 62 that are arcuate in shape and configured to at least partially surround the circumference of fuselage 24 or other component of the vehicle 20. Moreover, the first and second frames 60, 62 are adjustable and configured to at least partially overlap one another. In some embodiments, the overlapping configuration is used to provide adjustment capabilities of the first and second treating modules 52, 54, which allow for treatment of different sized fuselages 24 and other objects. Moreover, as illustrated in FIG. 2, the first treating module 52 is configured such that the first and/or second frames 60, 62 are radially adjustable with respect to the fuselage 24. As the first treating module 52 moves along the fuselage 24 the first and/or second frames 60, 62 are adjusted according to the fuselage diameter, topography, or other dimension and/or feature.

Figure 3:
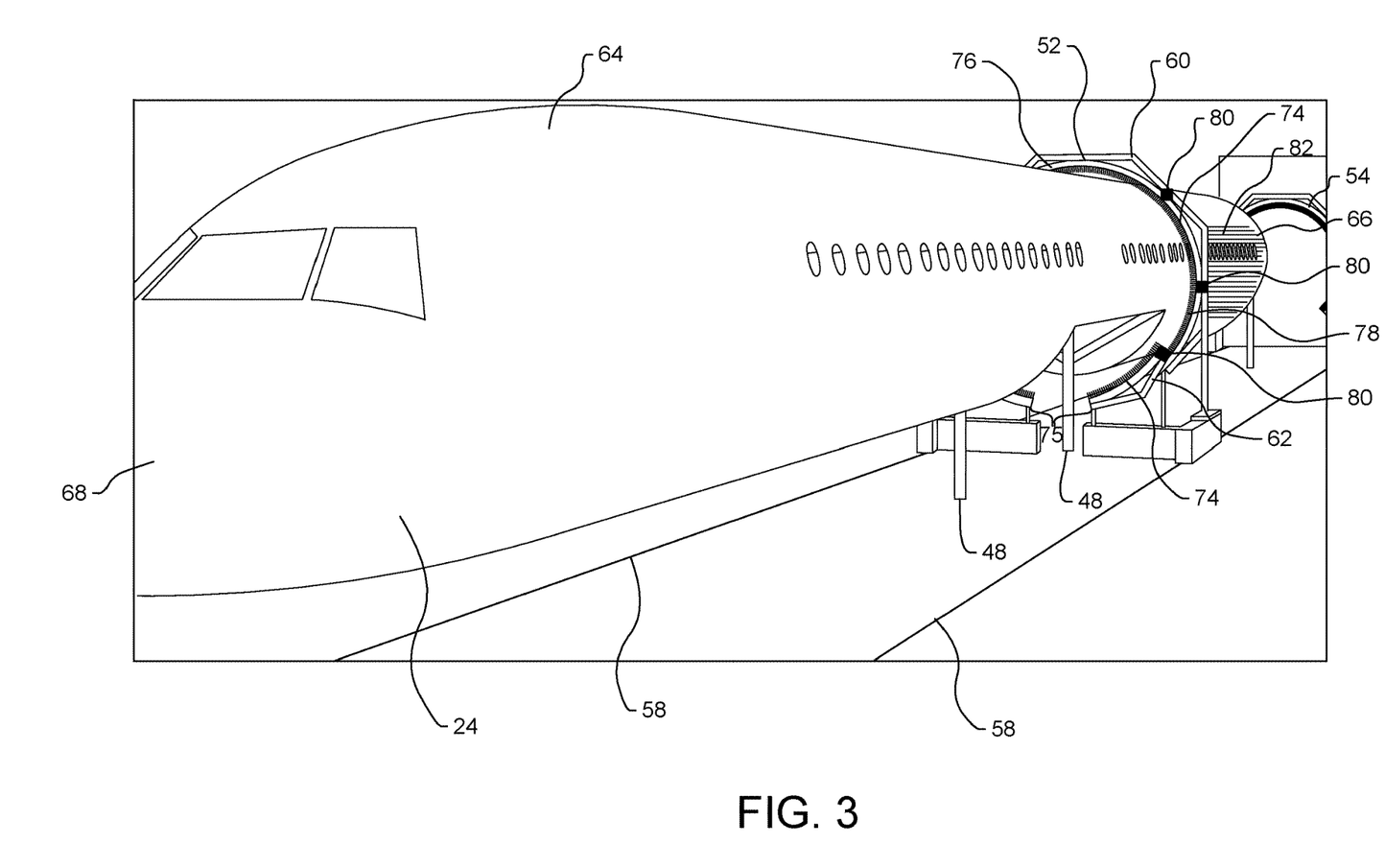
FIG. 3 is a perspective view of an exemplary tubular surface, being treated by the first treating module in accordance with the present disclosure.
Figure 4:
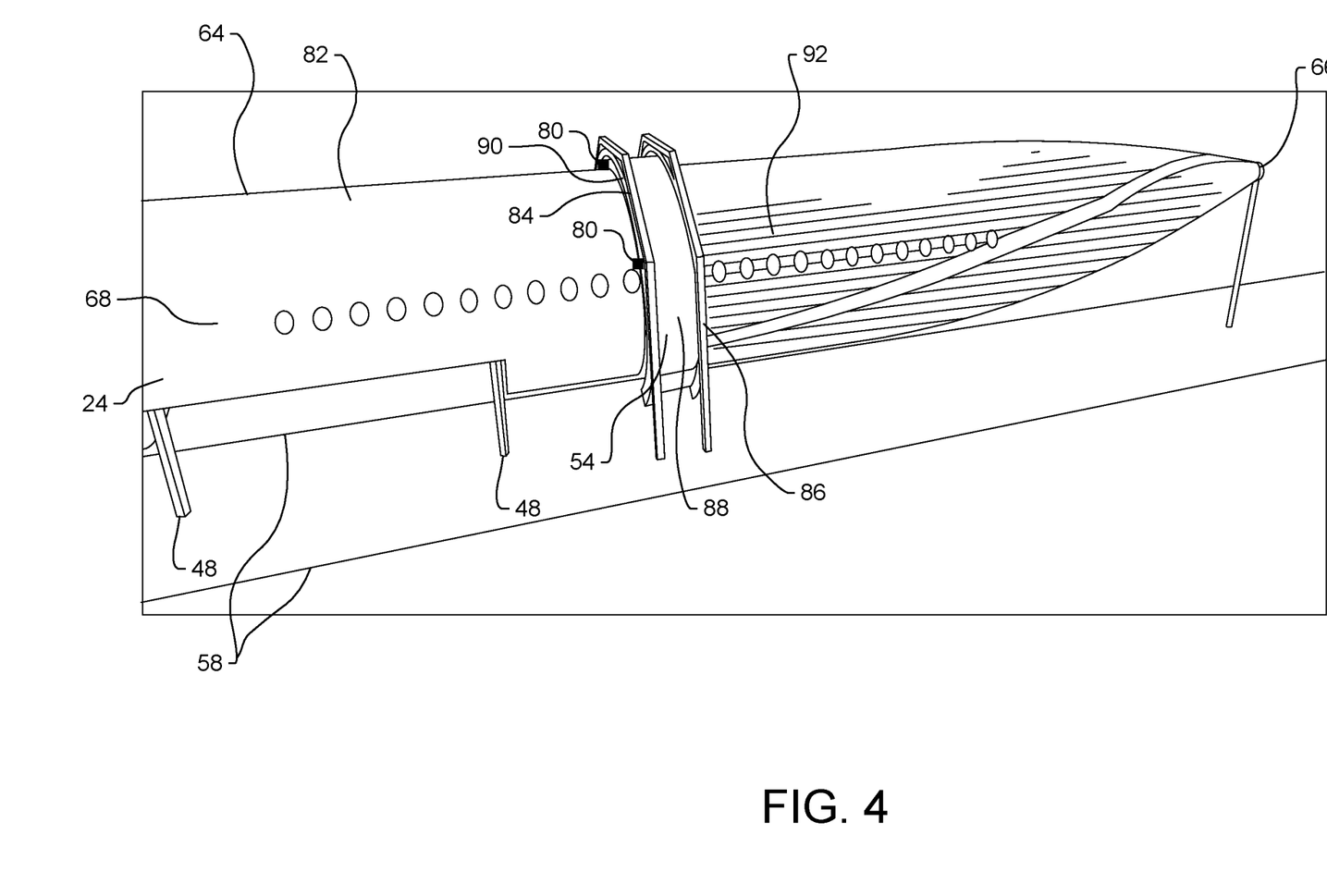
FIG. 4 is a perspective view of an exemplary tubular surface being treated by the second treating module in accordance with the present disclosure.

As further illustrated in FIGS. 2-4, at least one of the moveable platform 50 and/or rails 58 is utilized during the treatment of the tubular surface or fuselage surface 64 such that the fuselage 24 and the first and second treating modules 52, 54 are movable with respect to one another. In one exemplary embodiment, the fuselage 24, or other component, is positioned and supported in a stationary or static position while the first and second treating modules 52, 54 are movably coupled to the rails 58 and configured to travel along a length of the fuselage 24. Moreover, in an embodiment, the first and second treating modules 52, 54 are used to treat at least a portion of the fuselage surface 64 such that the first and second sets of treating units 74, 88, which are coupled to the first and second treating modules 52, 54, start at a first position 66 and move towards a second position 68

(FIGS. 3 and 4). Alternatively, the first and second treating modules 52,54 treat the fuselage surface 64 starting at the second position 68 and moving towards the first position 66. In one non-limiting example, the first and second treating modules 52, 54 are configured to treat the fuselage surface 64 along an axis A-A which is defined to extend between a first surface end 70 and a second surface end 72 of the fuselage 24. Furthermore, in one non-limiting example the first surface end 70 is defined as the tail section 28 of the fuselage 24 and the second surface end 72 is defined as the nose portion 45 of the fuselage 24. The first and second treating modules 52, 54 may start at the first surface end 70 and move towards the second surface end 72 or alternatively, start at the second surface end 72 and move towards the first surface end 70.

FIG. 3, illustrates one example of the first treating module 52 circumferentially surrounding the fuselage 24 at an intermediate position along the rails 58. In one embodiment, the first treating module 52 includes the first frame 60 and the second frame 62, and the first and second frames 60, 62 are configured with a plurality of treating units 74. Furthermore, in some embodiments, the first and second frames 60, 62 are configured with a space 75 such that the stationary support frames 48, or other obstacles, do not obstruct or interfere with the first treating module 52 as it travels along the rails 58. In some embodiments, the treating units 74 are arranged around the first and second frames 60, 62 such that the treating units 74 form an arcuate array 76 which at least partially surrounds the circumference of the fuselage surface 64. Moreover, in an exemplary embodiment, the treating units 74 are composed of a plurality of applicator heads 78 or nozzles 78 and the treating units 74 are movably attached to the first and second frames 60, 62 such that the applicator heads 78 are able to actuate and adjust to changing dimensions and topography of the fuselage 24. For example, in some embodiments the first and second frames 60, 62, the treating units 74 and the applicator heads 78 are independently controllable and adjustable in order to maintain a specified gap between the applicator heads 78 and the fuselage surface 64. Furthermore, the treating units 74 and applicator heads 78 are continuously adjusted to maintain a normal or orthogonal relationship between the fuselage surface 64 and the applicator heads 78. In one non-limiting example, the first treating module 52 is equipped with one or more sensors 80 which are attached to and arranged around the first and second frames 60, 62. The plurality of sensors 80 are configured to scan the fuselage surface 64 and the surrounding area in order to carry out a host of functions, such as, collect metrology and other surface profile data, provide imaging data, track the location of the first treating module 52, determine the orientation of the treating units 74 and applicator heads 78, and any other such functions.

As further illustrated in FIG. 3, a first treatment layer 82 is applied to the fuselage surface 64 as the first treating module 52 moves from the first position 66 towards the second position 68, and the plurality of applicator heads 78 are independently controlled to selectively apply the first treatment layer 82 where it is needed. In some embodiments, the first position 66 is also the first surface end 70 located at the tail section of the fuselage 24, and the second position 68 is the second surface end 72 located at the nose portion 45 of the fuselage 24, and the applicator heads 78 of the first treating module 52 are independently controlled to treat the entire length of the fuselage surface 64. Alternatively, at least one of the first and second positions 66, 68 are defined at an intermediate location along the fuselage 24, and the applicator heads 78 of the first treating module 52 are independently controlled to treat the portion of the fuselage surface 64 between the defined first and second positions 66, 68.

The fuselage 24 is typically constructed from a material such as aluminum, aluminum alloy, titanium, carbon composite, or other known material. Furthermore, during treatment of the fuselage surface 64 the first treating module 52 applies one or more coatings such as a surface protective layer, an adhesion promoting layer, a primer layer, a basecoat layer, a top coat layer, a clear coat layer, or other known coatings, and the one or more coatings comprise the first treatment layer 82. Moreover, the first treating units 74 and applicator heads 78 are positioned on the first treating module 52 to spray or otherwise apply the first treatment layer 82 onto the fuselage surface 64 in a single pass as the first treating module 52 moves along the fuselage 24. In some embodiments, additional numbers of passes are performed along the fuselage surface 64, as needed. FIG. 3 shows a single first treating module 52, spraying or otherwise applying the first treatment layer 82 onto the fuselage surface 64. However, as discussed above, in some embodiments, a plurality of different coatings comprises the first treatment layer 82, such as a surface protective layer, an adhesion promoter, a primer layer, a basecoat layer, a top coat layer, a clear coat layer, or other known coatings. As a result, in one non-limiting example, the single first treating module 52 is configured to apply the plurality of coatings which comprise the first treatment layer 82, one coating at a time using one or more passes along the fuselage 24. In an alternative embodiment, a plurality of first treating modules 52 are configured to apply a single coating as each of the plurality of first treating modules 52 move along the fuselage surface 64. In yet another alternative embodiment, the single first treating module 52 is configured to move the first treating unit 74 from the fuselage first position 66 or first surface end 70 towards the fuselage second position 68 or second surface end 72 and apply a single coating which comprises the first treatment layer 82.

FIG. 4 illustrates an exemplary embodiment of the second treating module 54. Similar to the first treating module 52, the second treating module 54 is configured with a first frame 84 and a second frame 86 which are arcuate or annular in shape and configured to least partially circumferentially surround the fuselage 24 or other component of the vehicle 20. Furthermore, in some embodiments, the first and second frames 84, 86 are configured such that the stationary support frames 48, or other obstacles, do not obstruct or interfere with the second treating module 52 while traveling down the fuselage 24 along the rails 58. In one non-limiting example of the second treating module 54, the first frame 84 is axially spaced apart from the second frame 86, and one or more second treating units 88 are attached between the first and second frames 84, 86. Moreover, the second treating module 54 is aligned with the fuselage 24 and positioned along the rails 58 such that the second treating module 54 is capable of being propelled along the rails 58 during treatment of the tubular surface or fuselage surface 64. In some embodiments, the second treating module 54 incorporates a plurality of second treating units 88 formed from a plurality of applicator heads 90, and the second treating units 88 are organized into an arcuate array 94 (FIG. 5) around the second treating module 54. In one non-limiting example, the applicator heads 90 of the second treating module 54 are different from the applicator heads 78 of the first treating module 52. For example, the applicator heads 90 used in the second treating module 54 and second treating units 88 are ink jet type nozzles, such as piezoelectric or thermal print heads, whereas the applicator heads 78 incorporated into the first treating module 52 are spray nozzles or similar types of applicators. Alternatively, the first and second treating modules 52, 54 are configured such that the first and second sets of treating units 74, 88 use the same type of applicator heads 78, 90.

As further illustrated in FIG. 4, a second treatment layer 92 is applied to the fuselage surface 64 by the plurality of applicator heads 90 of the second treating module 54 as it moves along the fuselage 24 from the first position 66 towards the second position 68. In some embodiments, the plurality of applicator heads 90 are independently controlled to apply the second treatment layer 92 as the second treating module 54 moves from the first position 66 towards the second position 68. The second treatment layer 92 is applied to cover, or at least partially cover, the one or more coatings that make up the first treatment layer 82, and in one non-limiting example the second treatment layer 92 is an ink, a paint, or other color containing decorative and/or protective coating capable of being applied to the fuselage surface 64.

The second treating module 54 also has one or more sensors 80 positioned on and around the first and second frames 84, 86 of the second treating module 54. The sensors 80 are configured to scan the fuselage surface 64 and the surrounding areas in order to provide useful information such as, determine the location of the second treating module 54, maintain the orientation of the second treating units 88 and applicator heads 90, provide imaging data of the fuselage surface 64 and any other such functions. In some embodiments, the second treating units 88 and applicator heads 90 are adjustably attached to the first and second frames 84, 86 of the second treating module 54, and data collected by the sensors 80 is used to adjust and position the second treating units 88 and applicator heads 90. For example, during treatment of the fuselage surface 64 the second treating units 88 and the applicator heads 90 are continuously adjusted to ensure there is a proper distance or gap between the fuselage surface 64 and the applicator heads 90. Additionally, the applicator heads 90 are continuously monitored and adjusted such that the applicator heads 90 are maintained in a normal and/or orthogonal orientation with the fuselage surface 64.

Figure 5:
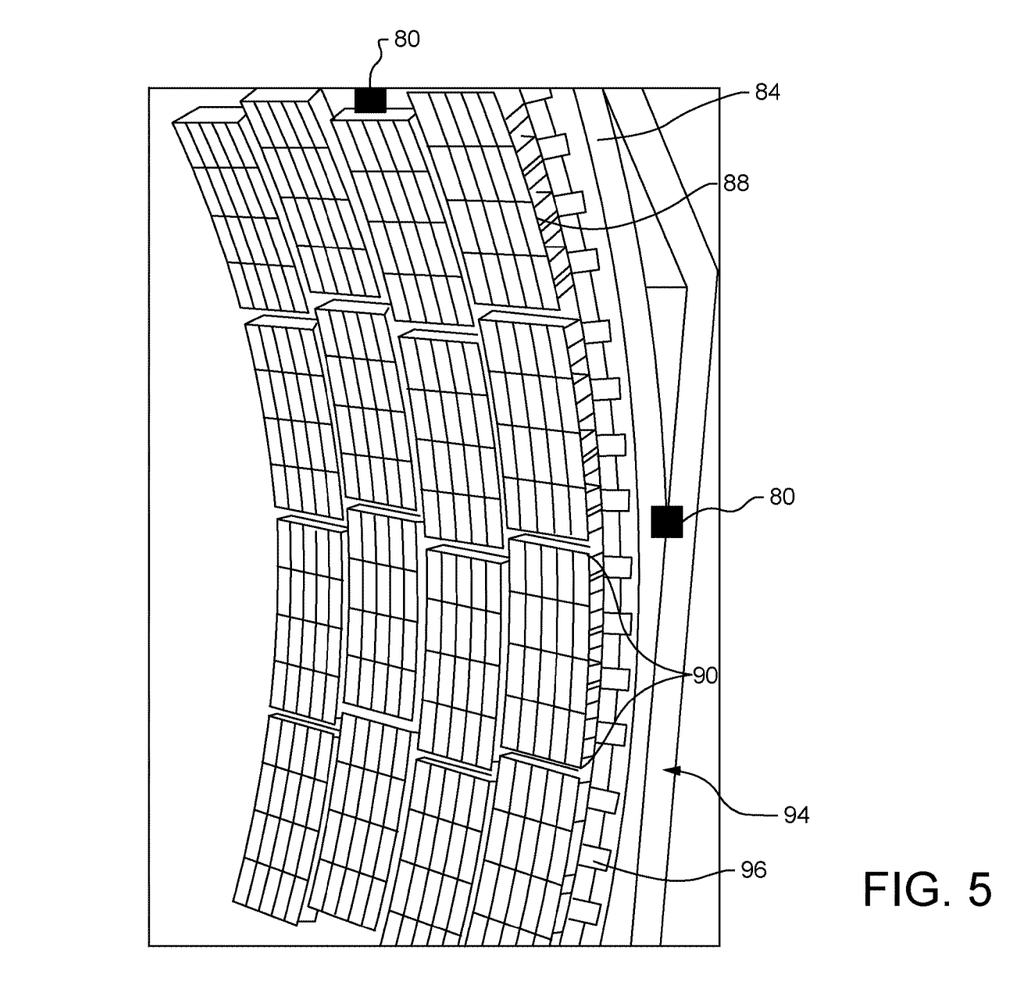
FIG. 5 is a perspective view of an embodiment of an array of treating units in accordance with the present disclosure.

FIG. 5 provides an embodiment of the second treating units 88 and applicator heads 90 that are mounted on the first and second frames 84, 86 (FIG. 4) of the second treating module 54. As discussed above, the second treating units 88 are composed of a plurality of applicator heads 90 and the second treating units 88 and applicator heads 90 are arranged to form one or more arcuate arrays 94 around the first and second frames 84, 86 of the second treating module 54. In one non-limiting example, the second treating units 88 and the applicator heads 90 are mounted in a staggered arrangement such that the second treating units 88 and applicator heads 90 are adjustable to account for changes in the fuselage 24 diameter, changes in the topography of the fuselage surface 64 and/or other such condition changes. Moreover, the staggered arrangement of the second treating units 88 provides a redundancy of applicator heads 90 at a given location of the fuselage surface 64. Such redundancy of applicator heads 90 will help with the throughput of the second treating module 54, as well as account for malfunctioning applicator heads 90. In some embodiments, the second treating module 54 has a plurality of sensors 80 that are similar to the sensors 80 incorporated with the first treating module 52. The sensors 80 are mounted around the first and second frames 84, 86 and in some embodiments, integrated into the second treating units 88. Furthermore, the arcuate arrays 94, second treating units 88, and applicator heads 90 are coupled with one or more articulation members 96 that adjust, articulate and control the arcuate arrays 94, second treating units 88, and applicator heads 90 based on data collected by the sensors 80.

Additionally, in one non-limiting example, multiple arcuate arrays 94 are staggered such that the second treating units and the applicator heads 90 of adjacent arcuate arrays 94 are positioned in an overlapping arrangement with one another. As a result, there is redundant application coverage of the second treatment layer 92 which helps with applying the second treatment layer 92 in a single pass of the fuselage surface 64, overcome malfunctioning applicator heads 90, rapidly adjust to changing dimensions and topography of the fuselage surface 64 and other material coverage uses. Furthermore, in one embodiment, the articulation members 96 are used to increase or decrease the staggered arrangement of the arcuate arrays 94 to optimize the performance of the second treating module 54. In some embodiments, each of the applicator heads 90 of the second treating module 54 are configured to apply a specific coating, such as an ink from the colors cyan, magenta, yellow and black, however other colors and materials applied by the applicator heads 90 is possible. Furthermore, during the application of the second treatment layer 92 specific colors are applied to the fuselage surface 64 according to a specified design or pattern that is to be created. In some embodiments, the second treating module 54 is configured to apply the second treatment layer 92 in a single pass as the second treating module 54 moves from the first position 66 towards the second position 68.

Figure 6:
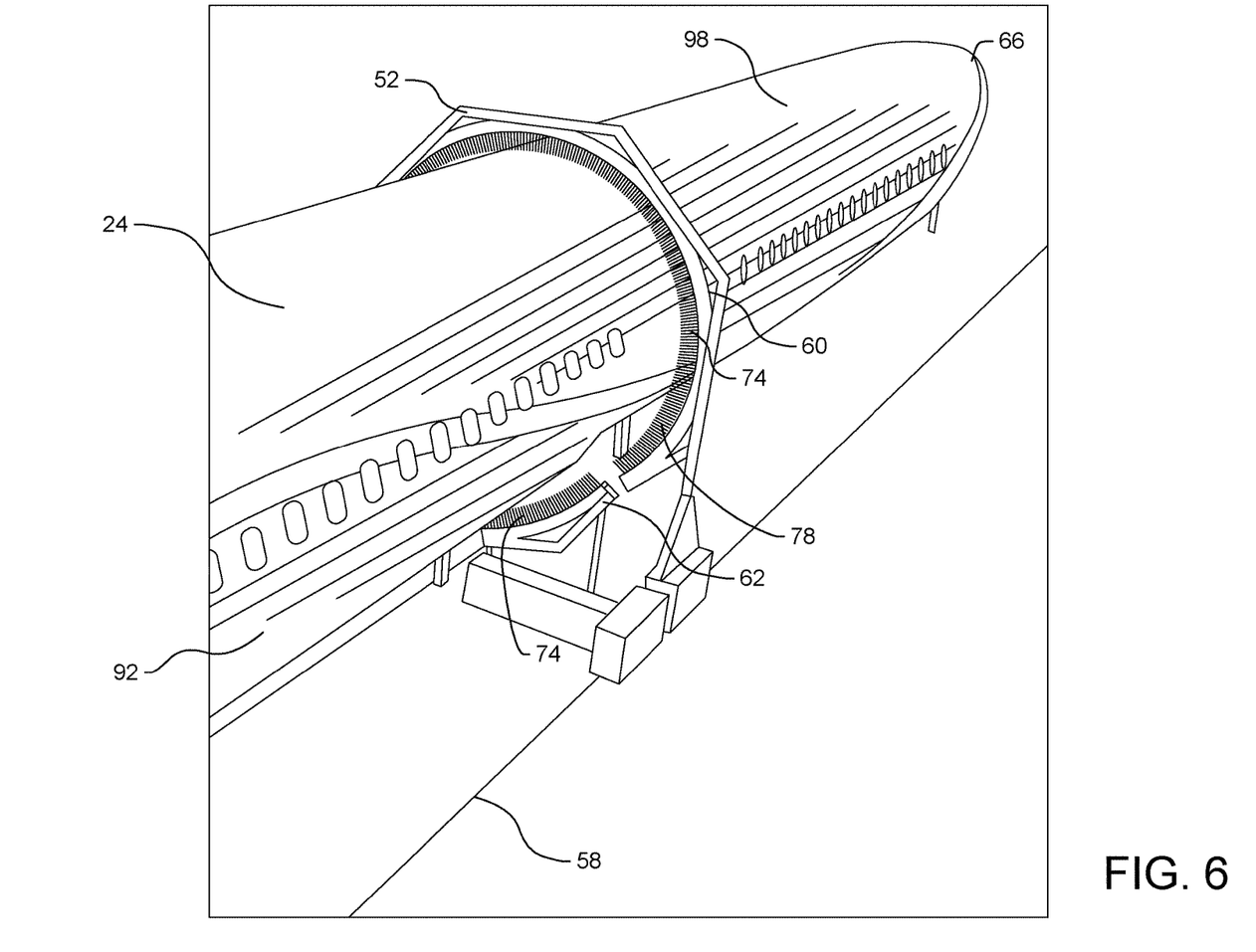
FIG. 6 is another perspective view of an exemplary tubular surface being treated by the first treating module in accordance with the present disclosure.

FIG. 6 illustrates an alternative exemplary embodiment of the first treating module 52. As discussed above, the first treating module 52 includes a first frame 60 and a second frame 62 and the first and second frames 60, 62 are configured with a plurality of treating units 74. In some embodiments, the treating units 74 are arranged around the first and second frames 60, 62 in order to form an arcuate array 76 of treating units 74 that at least partially surrounds the circumference of the fuselage surface 64. Furthermore, the treating units 74 are composed of a plurality of applicator heads 78, such as spray nozzles, showerhead nozzles, jetting heads, or other types of applicators. In some embodiments, the treating units 74 and applicator heads 78 are movably attached to the first and second frames 60, 62 such that the applicator heads 78 are adjustable and maneuverable to respond to changing dimensions of the fuselage 24 and topography of the fuselage surface 64. For example, the first and second frames 60, 62, treating units 74, and applicator heads 78 are radially adjustable in order to maintain a specified gap or application distance between the applicator heads 78 and the fuselage surface 64. Additionally, the treating units 74 and applicator heads 78 are adjustable in order to maintain a normal and orthogonal relationship between the fuselage surface 64 and the applicator heads 78. In some embodiments, the first treating module 52 is equipped with a plurality of sensors 80 attached and arranged around the first and second frames 60, 62. Alternatively or additionally, the sensors 80 are integrated with the treating units 74 and applicator heads 78. The plurality of sensors 80 are configured to collect data which is used by the first treating module 52, the treating units 74 and applicator heads 78 such as, scanning the fuselage surface and collect fuselage surface 64 profile data, collecting imaging data of the fuselage surface 64 and surrounding area, determining the position of the first treating module 52, treating units 74 and applicator heads 78, and other useful metrology data.

As further illustrated in FIG. 6, the first treating module 52 is used to apply a third treatment layer 98 on the fuselage surface 64 and in one non-limiting example the third treatment layer is applied over the decorative ink and color surface treatment created by the second treatment layer 92. As a result, in some embodiments the third treatment layer 98 is a transparent coating or clear coat, that is applied over the second treatment layer 92 and the color and decoration of the second treatment layer 92 is visible through the third treatment layer 98. The third treatment layer 98 acts as an additional protective layer or coating for the fuselage surface 64 and the overlying first and second treatment layers 82, 92. Furthermore, during treatment of the fuselage surface 64, the first treating module 52 applies the third treatment layer 98 as it moves along the axis A-A from the first position 66 towards the second position 68 of the fuselage 24. The first treating units 74 and the applicator heads 78 are configured to apply the third treatment layer 98 in a single pass or coat, however additional coats are applied as needed. Furthermore, the first treating module 52 is propelled along the rails 58 during the treatment of the fuselage surface 64. While FIG. 6 illustrates the use of the first treating module 52, it will be understood that alternative embodiments use the second treating module 54, or even a third or more treating modules, to apply the third treatment layer 98.

Figure 7:
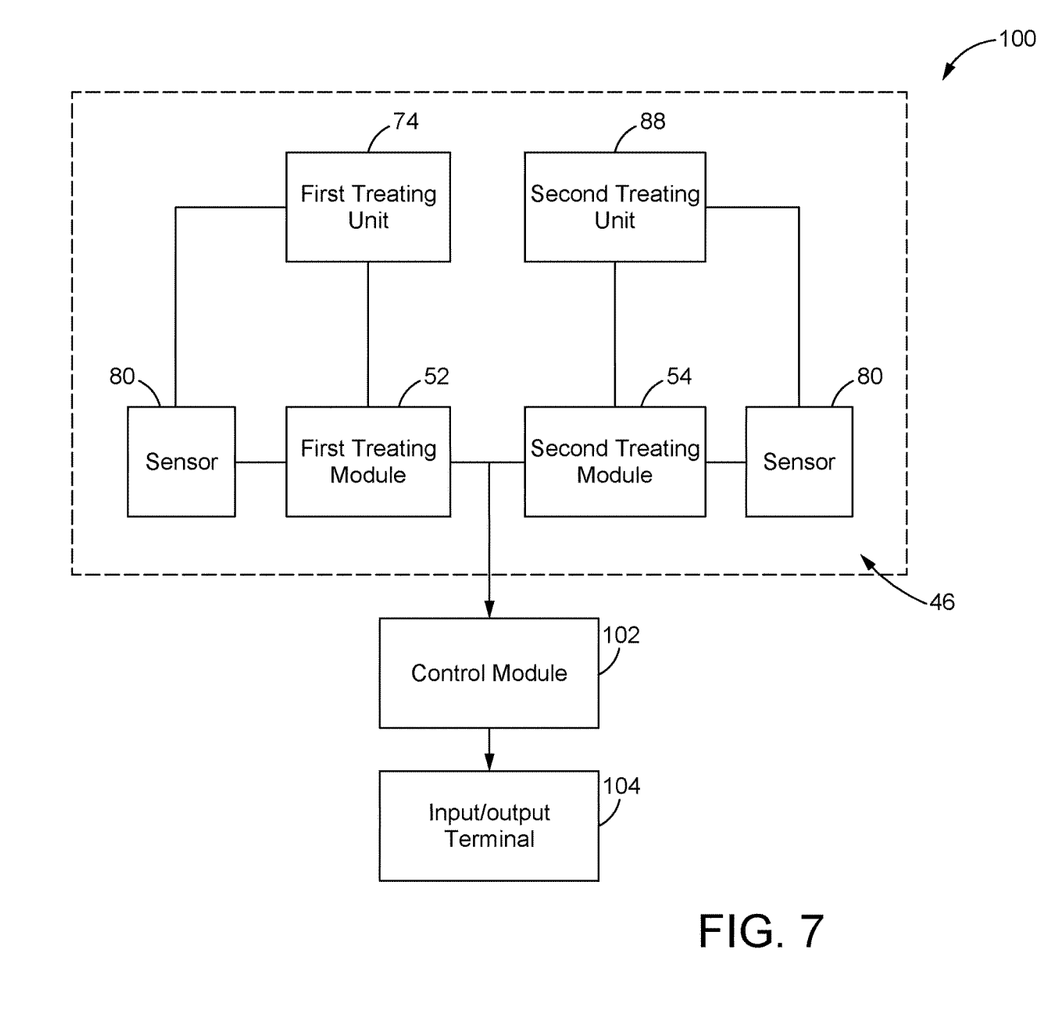
FIG. 7 is a schematic view of an exemplary control and communication system in accordance with the present disclosure.

FIG. 7 illustrates a schematic of a control and communication system 100 that is configured to operate and monitor the first and second treating modules 52, 54. The control and communication system 100 is composed of a control module 102 and an input/output terminal 104 which is communicably coupled to the first treating module 52 and the second treating module 54. In some embodiments, the control module 102 and the input/output terminal 104 are located remotely from the work area 46. As a result, communication between the control module 102 and the first and second treating modules 52, 54 is established using a radio frequency network, a computer data network, a Wi-Fi data network, a cellular data network, a satellite data network, or any other known communication network. Alternatively, the control module 102 and the input/output terminal 104 are configured to be proximally located in the work area 46 and set up in a position adjacent to the first and second treating modules 52, 54. In the proximally located configuration, the control module 102 still may be configured to communicate using a radio frequency network a computer data network, a Wi-Fi data network, a cellular data network, a satellite data network or any other known communication network.

A user of the control and communication system 100, such as an operator, a supervisor, or other interested personnel, can access the control module 102 using the input/output terminal 104. In some embodiments, the input/output terminal 104 allows for commands to be input through a keyboard, mouse, dial, button, touch screen, microphone or other known input devices. Furthermore, data and other information from the control and communication system 100 and the control module 102 will be output to a monitor, speaker, printer, or other known output device for the user. In some embodiments, the input/output terminal 104 is coupled to the control module 102 through a wired connection. Alternatively, the input/output terminal 104 is coupled to the control module 102 through a wireless communication network such as Bluetooth, near-field communication, a radio frequency network, a computer data network, a Wi-Fi data network, a cellular data network, a satellite data network or any other known communication network. In some embodiments, the input/output terminal 104 is a handheld mobile device, such as a tablet computer, a smart phone device, or other such mobile device, and the handheld mobile device is wirelessly coupled to the control module 102. As a result, a user and the handheld input/output terminal 104 may be remotely located from the control module 102 and/or the first and second treating modules 52, 54. Such a configuration will allow for flexibility of monitoring and operating the control and communication system 100 during treatment of the fuselage surface 64.

In some embodiments, the control module 102 is composed of a computing device capable of executing a control mechanism and/or software which allows the user to direct and control the first and second treating modules 52, 54. In one non-limiting example the user is able to use the control module 102 to program a pattern or process for the first and second treating modules 52, 54 to follow while applying the first treatment layer 82, the second treatment layer 92, and/or the third treatment layer 98. Furthermore, the communication network established between the control module 102 and the first and second treating modules 52, 54 allows for two-way communication such that commands sent by the control module 102 are received by the first and second treating modules 52, 54, and data which is sent by the first and second treating modules 52, 54 is received by the control module 102. In one non-limiting example, the sensors 80 are coupled to the control module 102, therefore the data collected by the sensors 80 is capable of being transmitted to the control module 102. As a result, the control module 102 uses the collected data from the plurality of sensors 80 to control and adjust the first and second treating modules 52, 54. For example, the sensors 80 may detect a change in the fuselage 24 dimensions, collect imaging data of the fuselage surface 64, provide positioning and location data of the first and second sets of treating units 74, 88 and first and second applicator heads 78, 90, and any other such data capable of being collected by the sensors 80. The collected data is then communicated to the control module 102 such that the control mechanism and/or software is able to make the necessary adjustments to the first and second treating modules 52, 54. Additionally, the user is able to view the data collected by the sensors 80 on the input/output terminal 104, and if necessary make necessary adjustments or control commands to the first and second treating modules 52, 54, using the input/output terminal 104. In some embodiments, the control and communications system 100 is capable of making real time adjustments to the first and second treating modules 52, 54 through the two-way communication link established between the first and second treating modules 52, 54 and the control module 102.

Figure 8:
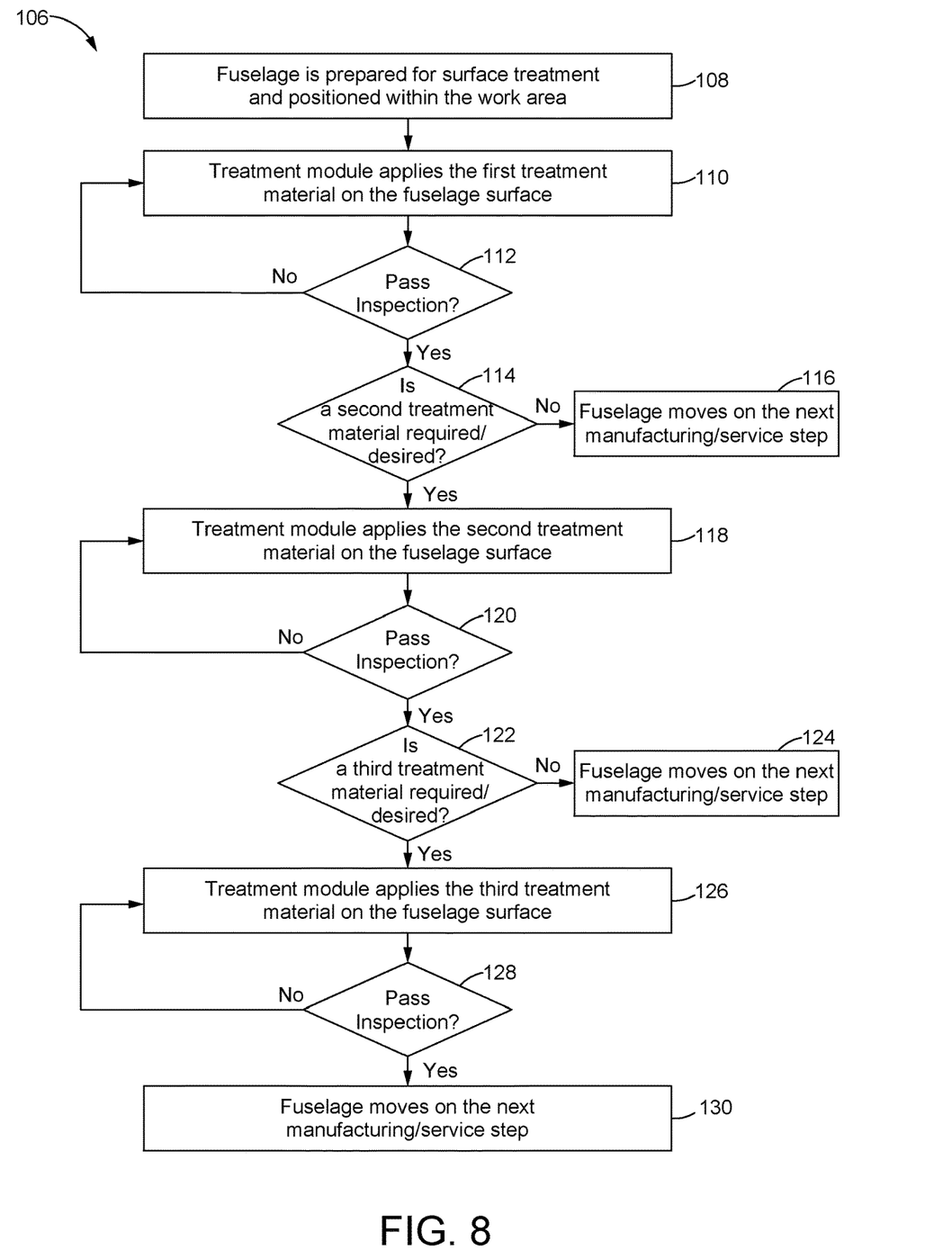
FIG. 8 is a flowchart illustrating an exemplary method of treating a tubular surface in accordance with the present disclosure.

Referring now to FIG. 8 and with reference to the proceeding FIGS. 1-7, a flowchart illustrating an exemplary method or process 106 of integrating automated surface treatments, such as arrayed spraying and ink jet printing, during the manufacturing and/or servicing of a vehicle 20 or machine. In a first block 108 of the automated surface treatment process 106, a tubular structure, such as an airplane fuselage 24, is prepared and positioned for surface treatment. In one non-limiting example, the surface preparation includes the removal of any protective coatings on the fuselage surface 64, masking certain areas of the vehicle 20 not to be treated, abrading, cleaning and drying the fuselage surface 64, and any other preparations needed prior to treatment of the fuselage surface 64. Furthermore, prior to the start of the surface treatment process 106 the tubular structure or fuselage 24 is moved into position within the work area 46 and secured to the stationary support frames 48 or other support platform. In a next block 110 of the automated surface treatment process 106, the first treating module 52 is positioned within the work area 46 and aligned with the fuselage 24, and the first treating module 52 is configured to apply a first treatment layer 82 on the fuselage surface 64. In some embodiments, the first treatment layer 82 is a plurality of protective and preparation materials and coatings, such as a surface protective coating, an adhesion promoting coating, a primer coating, a basecoat coating, a sol-gel coating, a top layer coating, a clear coating, and/or other protective and/or preparation coatings. Furthermore, the first treating module 52 is configured to apply each of the plurality of protective and preparation coatings which compose the first treatment layer 82. In an alternative embodiment, the first treatment layer 82 is composed of a single protective coating.

In some embodiments, the first treating module 52 is positioned at the first surface end 70 and/or first position 66 and moves towards the second surface end 72 and/or second position 68 of the fuselage 24, and one of the plurality of protective and preparation coatings is applied to the fuselage surface 64 as the first treating module 52 moves along the fuselage 24. Each additional protective and preparation coating of the first treatment layer 82 is applied in a single pass, but the first treating module 52 makes multiple passes along the fuselage surface 64 to apply the plurality of protective and preparation coatings which comprise the first treatment layer 82. Alternatively, a plurality of first treating modules 52 are used to apply each of the plurality of protective and preparation coatings of the first treatment layer 82 and each of the plurality of first treating modules 52 are configured to apply one protective and preparation material of the first treatment layer 82.

In an alternative embodiment, the first treating module 52 is positioned at the first surface end 70 and/or first position 66 and moves towards the second surface end 72 and/or second position of the fuselage 24. The arcuate array 76 of the applicator heads 78 of the first treating module 52 are configured to be independently controllable and adjustable in order to selectively apply a single protective and/or preparation coating, which comprises the first treatment layer 82, as the first treating module makes a single pass along the fuselage 24. For example, the single coating which comprises the first treatment layer 82 is a surface protective coating, an adhesion promoting coating, a primer coating, a basecoat coating, a sol-gel coating, a top layer coating, a clear coating, and/or other protective and/or preparation coatings.

According to the next block 112, an inspection is performed along the fuselage 24 and the fuselage surface 64 following the application of the first treatment layer 82 to check for any defects or other issues with the first treatment layer 82. If the inspection fails a set of determined inspection criteria, then the fuselage 24 goes through a rework process where additional surface treatments are performed by the first treating module 52 to correct any defects in order for the first treatment layer 82 to meet or exceed the criteria and pass the inspection. In some embodiments, the first treating module 52 will reapply a single protective and preparation coating of the first treatment layer 82 in order to correct the defect. Alternatively, the fuselage 24 is re-cleaned to provide a fresh fuselage surface 64 and the plurality of protective and preparation coatings of the first treatment layer 82 are reapplied to correct the defects.

Following inspection, in a next block 114, a determination of whether a second treatment layer 92 is required and/or desired is made. If the second treatment layer 92 is not required and/or desired, then in a next block 116, the surface treatment process 106 is concluded and the fuselage 24 moves on to the next manufacturing or service step. However, if a second treatment layer 92 is required, then in a next block 118, the second treating module 54 starts the application of the second treatment layer 92. In some embodiments, the second treatment layer 92 is a decorative ink or colored coating that is applied over the first treatment layer 82. Moreover, the second treating module 54 is configured with a plurality of applicator heads 90, such as ink jet nozzles or other types of applicators, which are capable of printing a decorative pattern on the fuselage surface 64. The second treating module 54 is configured to apply the second treatment layer 92 on the fuselage surface 64 and the second treating module 54 moves from the first surface end 70 and/or first position 66 towards the second surface end 72 and/or second position 68. In some embodiments, the second treating module 54 moves along and treats the entire length of the fuselage surface 64, however the second treating module 54 is configured to treat the fuselage surface 64 as needed. Moreover, the second treating module 54 is configured to apply the second treatment layer 92 in a single pass as the second treating module 54 moves from the first surface end 70 and/or first position 66 towards the second surface end 72 and/or second position 68, but additional passes may be performed as needed to complete the surface treatment process 106.

A next block 120 has a second inspection process where the second treatment layer 92 is inspected for defects and any other issues. The second treatment layer 92 provides both a colorful decorative surface treatment and an additional protective layer to the fuselage surface 64. If any defects are detected and/or the fuselage 24 does not meet the defined inspection criteria, then the fuselage 24 will go through a rework process where the second treating module 54 reapplies at least a portion of the second treatment layer 92 to correct any defects that were detected. Alternatively, the second treatment layer 92 is removed and the second treating module 54 reapplies the second treatment layer 92 along the fuselage surface 64.

Following the second inspection step of block 120, a determination of whether a third treatment layer 98 is required and/or desired is made in block 122. If the third treatment layer 98 is not required and/or desired, then the surface treatment process 106 is concluded and the fuselage 24 moves on to the next manufacturing or service step in a next block 124. However, if the third treatment layer 98 is required, then in a next block 126, the third treatment layer 98 is applied to the fuselage surface 64. In block 126, the first treating module 52 is aligned with the fuselage 24 and configured to apply the third treatment layer 98. In some embodiments, the third treatment layer 98 is a clear coat or other type of protective coating which is applied over the second treatment layer 92 and the third treatment layer 98 provides a transparent coating to protect the second treatment layer 92 and the underlying fuselage surface 64. Furthermore, the third treatment layer 98 is applied to the fuselage surface 64 as the first treating module 52 moves from a first surface end 70 and/or first position 66 towards the second surface end 72 and/or second position 68.

A third inspection step is performed following the application of the third treatment layer 98 in a next block 128. The third inspection step looks for defects and any other issues present on the fuselage surface 64 or other portions of the fuselage 24. If any defects in the third treatment layer 98 are detected, then the fuselage 24 will go through a rework process where the third treatment layer 98 is reapplied to correct the defects. Alternatively, the third treatment layer 98 is removed and then reapplied in order to provide a defectfree application of the third treatment layer 98. Furthermore, the final inspection step is used to inspect the overall quality of the fuselage surface 64. If any defects are observed in the first 82, second 92, and/or third treatment layers 98, then the fuselage 24 is directed to go through the necessary rework steps in order to correct the defects and prepare the fuselage 24 for subsequent manufacturing steps and/or servicing steps. Upon meeting the final inspection requirements, in the next block 130, the fuselage 24 is prepared to move on from the work area 46. In some embodiments, the fuselage 24, is moved or otherwise transported to another location along the manufacturing and/or servicing line.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A surface treatment assembly for treating a tubular surface defining an axis between a front end of the tubular surface and a rear end of the tubular surface, the surface treatment assembly comprising:
    a first set of treating units including a plurality of contiguous, axially aligned treating units arranged to form a first arcuate array of treating units, to partially surround the tubular surface at a first position along the axis, each treating unit of the first set of treating units including a plurality of first applicator heads; and
    a control module configured to independently control each of the plurality of first applicator heads to selectively apply a first treatment to the tubular surface and move the first set of treating units from the first position along the axis towards a second position along the axis, wherein each treating unit of the first set of treating units traverses an axial path over the tubular surface from the first position along the axis to the second position along the axis.

2. The surface treatment assembly of claim 1, further comprising a second set of treating units including a plurality of contiguous, axially aligned treating units arranged in a second arcuate array, each treating unit of the second set of treating units including a plurality of second applicator heads, wherein the control module is further configured to independently control each of the plurality of second applicator heads to selectively apply a second treatment and move the second set of treating units from the first position along the axis to the second position along the axis, and wherein each treating unit of the second set of treating units traverses an axial path over the tubular surface from the first position along the axis to the second position along the axis.

3. The surface treatment assembly of claim 2, in which the control module further is configured to move the second set of treating units from the first position along the axis to the second position along the axis independently from the first set of treating units.

4. The surface treatment assembly of claim 3, in which the first and second sets of treating units are configured to apply the first and second treatments, respectively, on the tubular surface in a single pass.

5. The surface treatment assembly of claim 2, in which the second treatment is different from the first treatment.

6. The surface treatment assembly of claim 2, further comprising a plurality of sensors coupled to the first and second sets of treating units and configured to generate a data set, wherein the control module is further configured to determine a position of each of the plurality of first and second applicator heads and make real-time adjustments to the first and second sets of treating units based on the data set.

7. The surface treatment assembly of claim 6, in which the plurality of first and second applicator heads are supported for tiltable adjustment, and in which the control module further is configured to adjust the plurality of first and second applicator heads to maintain a normal orientation relative to the tubular surface based on the data set.

8. The surface treatment assembly of claim 7, in which the control module further is configured to utilize the data set to adjust application of the first and second treatments according to a change in diameter of the tubular surface.

9. The surface treatment assembly of claim 1, in which the first set of treating units is carried by first and second frames, and in which at least one of the first and second frames is radially adjustable relative to the tubular surface.

10. A surface treatment assembly for treating a tubular surface defining an axis between a front end of the tubular surface and a rear end of the tubular surface, the surface treatment assembly comprising:
    a first set of treating units supported for movement along the axis from a first position along the axis to a second position along the axis, the first set of treating units including a plurality of contiguous, axially aligned treating units arranged to form a first arcuate array of treating units, to partially surround the tubular surface;
    wherein each treating unit of the first set of treating units includes a plurality of first applicator heads configured to apply a first treatment to the tubular surface; and
    wherein each treating unit of the first set of treating units traverses an axial path over the tubular surface from the first position along the axis to the second position along the axis.

11. The surface treatment assembly of claim 10, further comprising a second set of treating units supported for movement along the axis from the first position along the axis to the second position along the axis, the second set of treating units including a plurality of contiguous, axially aligned treating units arranged in a second arcuate array to partially surround the tubular surface, wherein each treating unit of the second set of treating units includes a plurality of second applicator heads configured to apply a second treatment to the tubular surface, and wherein each treating unit of the second set of treating units traverses an axial path over the tubular surface from the first position along the axis to the second position along the axis.

12. The surface treatment assembly of claim 11, in which the first and second sets of treating units are configured to apply the first and second treatments, respectively, on the tubular surface in a single pass.

13. The surface treatment assembly of claim 11, in which the second treatment is different from the first treatment.

14. The surface treatment assembly of claim 10, in which the first set of treating units is carried by first and second frames, and in which at least one of the first and second frames is radially adjustable relative to the tubular surface.

15. A surface treatment assembly for treating a surface of an airplane fuselage defining an axis between a front end of the surface and a rear end of the surface, the surface treatment assembly comprising:
  a first treating module including:
    a first frame assembly configured to traverse along the axis from a first position along the axis to a second position along the axis; and
    a first set of treating units coupled to the first frame assembly, the first set of treating units including a plurality of contiguous, axially aligned treating units arranged to form a first arcuate array of treating units, to partially surround the airplane fuselage, each treating unit of the first set of treating units including a plurality of first applicator heads; and
  a control module operably coupled to the first frame assembly and each of the plurality of first applicator heads, the control module being programmed to:
    move the first frame assembly along the axis from the first position to the second position; and
    while the first frame assembly is moving, to independently control each of the plurality of first applicator heads to selectively apply a first treatment to the airplane fuselage, wherein each treating unit of the first set of treating units traverses an axial path over the airplane fuselage.

16. The surface treatment assembly of claim 15, further comprising:
  a second treating module including:
    a second frame assembly configured to traverse along the axis from the first position along the axis to the second position along the axis; and
    a second set of treating units coupled to the second frame assembly, the second set of treating units including a plurality of contiguous, axially aligned treating units arranged in a second arcuate array to partially surround the airplane fuselage, each treating unit of the second set of treating units including a plurality of second applicator heads;
  wherein the control module is operably coupled to the second frame assembly and each of the plurality of second applicator heads, the control module further being programmed to:
    move the second frame assembly along the axis from the first position to the second position; and
    while the second frame assembly is moving, to independently control each of the plurality of second applicator heads to selectively apply a second treatment to the airplane fuselage, wherein each treating unit of the second set of treating units traverses an axial path over the airplane fuselage.

17. The surface treatment assembly of claim 16, further comprising a plurality of sensors coupled to the first and second sets of treating units and configured to generate a data set, wherein the control module is further configured to determine a position of each of the plurality of first and second applicator heads and make real-time adjustments to the first and second sets of treating units based on the data set.

18. The surface treatment assembly of claim 17, in which the plurality of first and second applicator heads are supported for tiltable adjustment relative to the first and second frame assemblies, respectively, and in which the control module further is configured to adjust the plurality of first and second applicator heads to maintain a normal orientation relative to the airplane fuselage based on the data set.

19. The surface treatment assembly of claim 18, in which the control module further is configured to utilize the data set to adjust application of the first and second treatments according to a change in diameter of the airplane fuselage.

20. The surface treatment assembly of claim 15, in which the first frame assembly comprises first and second frames, and in which at least one of the first and second frames is radially adjustable relative to the airplane fuselage.

\* \* \* \* \*